(12) United States Patent
Luce

(10) Patent No.: US 6,862,929 B2
(45) Date of Patent: Mar. 8, 2005

(54) PRESSURE SENSOR INTENDED TO BE MOUNTED IN A TIRE, AND SUPPORT THEREFOR

(75) Inventor: Dominique Luce, Toulouse (FR)

(73) Assignee: Siemens VDO Automotive, Toulouse Cedex 1 (FR)

( * ) Notice: Subject to any disclaimer, the term of this patent is extended or adjusted under 35 U.S.C. 154(b) by 59 days.

(21) Appl. No.: 10/281,253

(22) Filed: Oct. 28, 2002

(65) Prior Publication Data

US 2003/0079537 A1 May 1, 2003

(30) Foreign Application Priority Data

Oct. 29, 2001 (FR) .............................................. 01 13934

(51) Int. Cl.⁷ .............................................. B60C 23/00
(52) U.S. Cl. ..................... 73/146.8; 73/146.3
(58) Field of Search ............................... 73/146, 146.2, 73/146.3, 146.8; 340/425.5, 438, 442

(56) References Cited

U.S. PATENT DOCUMENTS

| | | | |
|---|---|---|---|
| 5,844,131 A | * | 12/1998 | Gabelmann et al. ....... 73/146.8 |
| 6,055,855 A | | 5/2000 | Straub |
| 6,557,406 B2 | * | 5/2003 | Gabelmann ................ 73/146.5 |
| 6,588,446 B2 | * | 7/2003 | Reinhardt ................... 137/223 |
| 2002/0046599 A1 | * | 4/2002 | Chuang et al. ............... 73/146 |
| 2003/0112137 A1 | * | 6/2003 | Saheki ....................... 340/442 |
| 2003/0154779 A1 | * | 8/2003 | Polenghi .................... 73/146.8 |

FOREIGN PATENT DOCUMENTS

| | | |
|---|---|---|
| DE | 200 15 295 | 4/2001 |
| DE | 201 10 716 | 10/2001 |

* cited by examiner

Primary Examiner—Eric S. McCall
(74) Attorney, Agent, or Firm—Young & Thompson

(57) ABSTRACT

This pressure sensor (8) is intended to be placed in a tire mounted on a rim (2) equipped with a valve (6) allowing air to be let into and removed from the tire. It comprises a support (22) fixed at the level of the valve (6) by a screw or the like. The support (22) comprises a wall (30) for bearing on the valve (6), this wall (30) being elastically articulated to the rest of the support (22).

20 Claims, 1 Drawing Sheet

PRESSURE SENSOR INTENDED TO BE MOUNTED IN A TIRE, AND SUPPORT THEREFOR

BACKGROUND OF THE INVENTION

The present invention relates to a pressure sensor intended to be mounted in a tire and more particularly to the support for such a sensor.

It is known practice for a tire, of a private car or of a heavy goods vehicle, to be equipped with a pressure sensor so as to determine the pressure inside this tire without having to connect a pressure sensor to the corresponding valve. Such sensors are used in tire-pressure monitoring systems with which certain vehicles are equipped. A system such as this is known to those skilled in the art.

The tire is mounted on a rim and a valve allows air to be introduced under pressure to inflate the tire or alternatively also to allow air to escape from the tire. When such a tire is equipped with a pressure sensor, this sensor is generally fixed to the rim at the level of the valve.

Such a sensor is subject to numerous stresses, not only centrifugal force as the wheel turns but also many vibrations and accelerations. The sensor therefore has a natural tendency to vibrate, or even to oscillate along the periphery of the rim even though it is generally desirable for the sensor to be held against the rim of the wheel in order to limit the stress experienced.

Document U.S. Pat. No. 6,055,855 for example discloses a pressure sensor mounted on a valve in the automotive field. A mechanical articulation of the bore-joint type is produced between the housing of the sensor described in that document and the corresponding valve. This articulation allows the sensor to be adapted to suit various rim profiles. This fixing of the sensor entails a valve which is specially designed for the attachment of the sensor.

SUMMARY OF THE INVENTION

The object of the present invention is therefore to provide a sensor and a corresponding support offering better positioning on a rim than the sensors of the prior art. As a preference, this sensor, or sensor support, will be of an advantageous cost price by comparison with the known sensors.

To this end, the present invention proposes a pressure sensor intended to be placed in a tire mounted on a rim equipped with a valve allowing air to be put into and let out of the tire, the sensor comprising a support fixed at the level of the valve.

According to the invention, the support comprises a wall for bearing on the valve, this wall being elastically articulated to the rest of the support.

The articulation thus produced forms a fold of a flexibility that allows the sensor to be placed as close as possible to the rim. The sensor support according to the invention thus serves both to fix the sensor to the rim (or the valve) and also to adjust the position of the sensor to suit the profile of the rim. The support may be fixed at the level of the valve by any means. By way of examples, this fixing is thus achieved using a screw or the like or alternatively by the valve.

In an advantageous embodiment making it possible to obtain a sensor at an advantageous price, the support is made of synthetic material and the bearing wall forms just one piece with the support. In this case, the elastic articulation between the bearing wall and the rest of the support is preferably produced by thinning the material, giving it elasticity.

To limit the deformation at the level of the elastic articulation, the edge of the bearing wall opposite the elastic articulation is, for example, connected to the rest of the support by a bellows. In this embodiment, it may be contrived that the space defined by the bearing wall, the bellows and the rest of the support is closed at both ends.

For better damping of the vibrations originating from the rim and propagating toward the sensor, provision may be made for the support advantageously to comprise a lip placed on the opposite side to the bearing wall and intended to come into contact with the rim when the sensor is in the mounted position. This lip preferably forms just one piece with the support.

BRIEF DESCRIPTION OF THE DRAWINGS

The details and advantages of the present invention will be better apparent from the description which follows, given with reference to the appended diagrammatic drawing in which.

DESCRIPTION OF THE PREFERRED EMBODIMENTS

Figure 1:
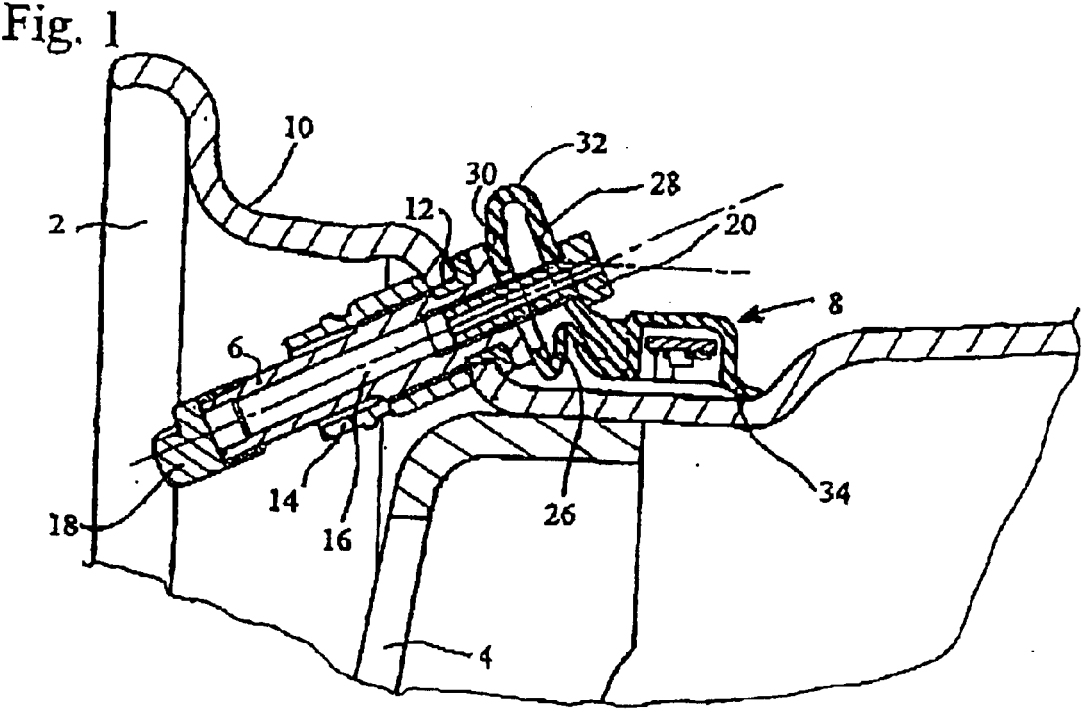
FIG. 1 is a view in part section of a sensor according to the invention, mounted on a rim.

FIG. 1 depicts, partially, in section, a rim 2 and a disk 4 of a wheel and, in section, a valve 6 and a pressure sensor 8. The rim 2 has a shoulder 10 intended to accommodate a tire, not depicted.

In a known way, the rim 2 has a bore 12 intended to accommodate the valve 6. The latter is fitted before the tire and is held in place by a nut 14.

The valve 6 comprises an interior passage 16 intended, in a known way, to allow air to be let into the tire or alternatively to allow this air to be removed. A cap 18 closes this passage 16 at its end situated outside the tire.

Figure 2:
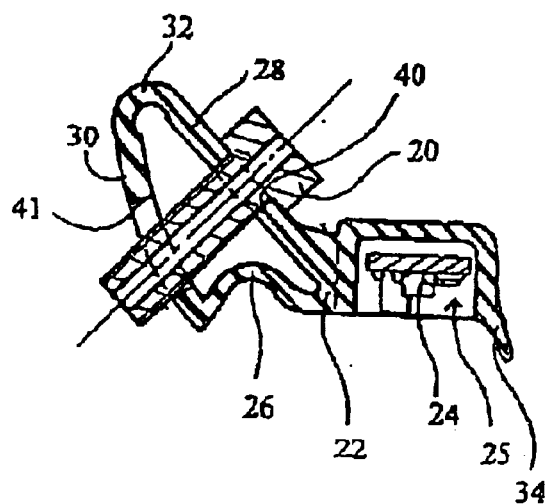
FIG. 2 is a view in section of the sensor of FIG. 1, in the same plane of section before it is mounted on the rim and on a larger scale.

FIG. 2 depicts the assembly formed by the sensor 8 and a screw 20 that allows the sensor 8 to be fixed to the valve 6. The screw 20 is of conventional form and comprises a threaded circular cylindrical shank at one end of which there is a screw head. The screw in its entirety is axially pierced to extend the passage 16 of the valve 6.

The sensor 8 comprises a support 22 made of synthetic material, on which there sit on the one hand the actual pressure sensor 24 proper, a transmitter (not depicted) allowing the results of the measurements made by the pressure sensor to be transmitted to a receiver situated on board a corresponding vehicle, various electronic components for managing the sensor and means for electrically powering the sensor. These various electronic components will not be described in detail here because they are known to those skilled in the art.

The synthetic support 22 of the sensor is, for example, obtained by molding. It has, on the one hand, one or more housing(s) for accommodating the various electronic components of the sensor 8 and, on the other hand, it is shaped to allow the sensor 8 to be fixed to the valve 6. A housing 25 is depicted in the drawing and houses the actual pressure sensor 24 proper.

On the same side as the valve 6, the support 22 has an original shape. It has two walls which are elastically articulated by an elbow 32 and a bellows 26. A first wall 28 is rigid and secured to the part of the support 22 in which the various electronic components are housed. This first wall 28 has a bore 40 to allow the passage of the screw 20 and acts as a bearing face for the head of this screw 20. The second wall 30 faces the first wall 28 and is also rigid and equipped with an oblong bore 41 to allow the passage of the screw 20 and to allow the wall 30 to rotate about the elbow 32 during tightening. This wall is intended to come to bear against the valve 6. The elastic elbow 32 connects the two walls 28 and 30 which form just one single piece with the rest of the support 22. Its elasticity is obtained for example by thinning the material. When the sensor 8 is mounted, the elbow is on the opposite side to the rim 2, that it to say toward the inside of the tire. The shape of the elbow 32 is tailored, particularly on the inside of the elbow, to avoid any appearance of cracks when the two walls move with respect to one another or when the elbow 32 is stressed.

The bellows 26, the presence of which is optional, connects the two walls 28 and 30 on the opposite side to the elbow 32. It is in the form of a thin and flexible web which folds (cf. particularly FIG. 1) when the two walls 28 and 30 are moved closer together. It makes it possible to limit the space between the two walls 28 and 30 prior to the mounting of the sensor 8 on the valve 6 and positions these walls when the sensor 8 is fixed to the valve 6.

Depending on the desired elasticity between the two walls 28 and 30, it may be anticipated for the bellows 26 to be designed to close or not close the empty space between the two walls 28 and 30.

The sensor 8 is fixed to the valve 6 by the screw 20. The sensor 8 is placed in such a way that the wall 30 articulated to the rest of the sensor comes into contact with the valve 6. The screw 20 passes through the two walls 28 and 30 at the level of the bores 40 and 41 and collaborates with a tapped thread produced at the end of the passage 16 of the valve 6 opening in the tire. As the screw 20 is screwed in, the elbow 32 bends. The wall 30 presses against the valve 6. The rest of the support 22 then becomes pressed against the rim 2. At the end of screwing, the screw 20 is tightened and immobilizes the sensor in the bottom of the rim profile. It can be seen in the embodiment of the support 22 depicted in the drawing that the support comprises, on the edge intended to be on the opposite side of the rim 2 to the valve 6, a lip 34. The latter is shown at rest in FIG. 2, and bearing against the rim bottom profile in FIG. 1. As the screw 20 is being tightened, the lip 34 gradually becomes flattened against the rim 2, while the elbow 32 bends. The lip 34 thus ensures that the support 22 bears continuously against the rim 2. This lip preferably forms one single piece with the support 22. Its elasticity and its deformability are obtained by thinning the material of the support.

Thus, when the screw 20 is tightened, the sensor 8 is held perfectly with respect to the rim. The presence of the elbow 32 and of the lip 34 thus make it possible to limit the vibrations transmitted to the electronic components of the sensor 8.

The pressure sensor described hereinabove can be adapted to suit various rim profiles while at the same time giving a solution which differs from the solutions known in the prior art. By grouping together mechanical functions (fixing of the sensor to the rim—or the valve—, adjustment of the position of the sensor to suit the wheel profile) merely in the form of the sensor support, the cost price becomes minimal. Indeed, only the form of the support is affected and a change to the mold to allow the sensor support to be produced is enough to obtain the sensor according to the invention. The on-cost in synthetic material is also low. It will be noted above all that this sensor may be mounted on a conventional valve and therefore entails no additional cost as far as the valve is concerned.

The pressure sensor described also allows better use of the available volume. It is better integrated into the rim profile and is therefore less exposed to the knocks caused when changing tires, for example.

As an alternative (not depicted), the screw 20 that clamps the support 22 may be omitted. In this case, the valve 6 is introduced directly into the bores 40 and 41 made in the support 22 and it is the head of the valve which presses on and directly squashes the first wall 28 against the bearing wall 30 on the interior profile 10 of the rim.

The present invention is not restricted to the preferred exemplary embodiment described hereinabove by way of nonlimiting example. It relates to all alternative forms of embodiment within the competence of the person skilled in the art in the context of the claims which follow.

Thus, for example, the support described comprises, on the same side as the valve, a single elastic elbow. It may be anticipated for there to be several flexible folds, for example giving the support a concertina region.

The deformation of the elbow is described as being purely elastic. During or at the end of tightening, plastic deformation may be obtained without in any way departing from the scope of the invention.

What is claimed is:

1. A pressure sensor (8) intended to be placed in a tire mounted on a rim (2) equipped with a valve (6) allowing air to be put into and let out of the tire, the sensor (8) comprising a support (22) fixed at the level of the valve (6), the support (22) comprising a sensor housing (25) and a wall (30) for bearing on the valve (6), this wall (30) being elastically articulated to the housing (25), whereby the sensor housing (25) is tiltable relative to a longitudinal axis of the valve (6).

2. The pressure sensor as claimed in claim 1, wherein the support (22) is made of synthetic material and in that the bearing wall (30) forms just one piece with the support (22).

3. The pressure sensor as claimed in claim 2, wherein the elastic articulation (32) between the bearing wall (30) and the rest of the support is produced by thinning the material, giving it elasticity.

4. A pressure sensor (8) intended to be placed in a tire mounted on a rim (2) equipped with a valve (6) allowing air to be put into and let out of the tire, the sensor (8) comprising a support (22) fixed at the level of the valve (6), wherein the support (22) comprises a wall (30) for bearing on the valve (6), this wall (30) being elastically articulated to the rest of the support (22), and wherein an edge of the bearing wall (30) opposite the elastic articulation (32) is connected to the rest of the support by a bellows (26).

5. The pressure sensor as claimed in claim 4, wherein a space defined by the bearing wall (30), the bellows (26) and the rest of the support is closed at both ends.

6. The pressure sensor as claimed in claim 1, wherein the support (22) further comprises a lip (34) placed on the opposite side to the bearing wall (30) and intended to come into contact with the rim (2) when the sensor (8) is in the mounted position.

7. The pressure sensor as claimed in claim 6, wherein the lip (34) forms just one piece with the support (22).

8. The pressure sensor as claimed in claim 2, wherein an edge of the bearing wall (30) opposite the elastic articulation (32) is connected to the rest of the support by a bellows (26).

9. The pressure sensor as claimed in claim 3, wherein an edge of the bearing wall (30) opposite the elastic articulation (32) is connected to the rest of the support by a bellows (26).

10. The pressure sensor as claimed in claim 2, wherein a space defined by the bearing wall (30), the bellows (26) and the housing is closed at both ends.

11. The pressure sensor as claimed in claim 3, wherein a space defined by the bearing wall (30), the bellows (26) and the housing is closed at both ends.

12. The pressure sensor as claimed in claim 2, wherein the support (22) further comprises a lip (34) placed on the opposite side to the bearing wall (30) and intended to come into contact with the rim (2) when the sensor (8) is in the mounted position.

13. The pressure sensor as claimed in claim 3, wherein the support (22) further comprises a lip (34) placed on the opposite side to the bearing wall (30) and intended to come into contact with the rim (2) when the sensor (8) is in the mounted position.

14. The pressure sensor as claimed in claim 4, wherein the support (22) further comprises a lip (34) placed on the opposite side to the bearing wall (30) and intended to come into contact with the rim (2) when the sensor (8) is in the mounted position.

15. The pressure sensor as claimed in claim 5, wherein the support (22) further comprises a lip (34) placed on the opposite side to the bearing wall (30) and intended to come into contact with the rim (2) when the sensor (8) is in the mounted position.

16. The pressure sensor as claimed in claim 14, wherein the lip (34) forms just one piece with the support (22).

17. A sensor for sensing pressure inside a tire having a valve, the sensor comprising:

a pressure sensor inside a housing; and a wall attached to said housing by a flexible portion so that said housing is tiltable relative to said wall, said wall having a first opening arranged and adapted to receive a portion of a valve inside a tire whose pressure is to be sensed.

18. The sensor of claim 17, wherein said wall further comprises a hinge and an extension connected to said hinge, said extension having a second opening that is also arranged and adapted to receive a portion of a valve.

19. The sensor of claim 18, wherein said first opening is round and said second opening is oblong.

20. The sensor of claim 18, wherein said wall and said extension more rigid than said flexible portion.

* * * * *